(12) United States Patent
Matischek

(10) Patent No.: US 10,848,642 B2
(45) Date of Patent: Nov. 24, 2020

(54) APPARATUS FOR GENERATING TRUSTED IMAGE DATA, AN APPARATUS FOR AUTHENTICATION OF AN IMAGE AND A METHOD FOR GENERATING TRUSTED IMAGE DATA

(71) Applicant: Infineon Technologies AG, Neubiberg (DE)

(72) Inventor: Rainer Matischek, Graz (AT)

(73) Assignee: Infineon Technologies AG, Neubiberg (DE)

( * ) Notice: Subject to any disclaimer, the term of this patent is extended or adjusted under 35 U.S.C. 154(b) by 779 days.

(21) Appl. No.: 13/865,362

(22) Filed: Apr. 18, 2013

(65) Prior Publication Data

US 2014/0314235 A1 Oct. 23, 2014

(51) Int. Cl.
*H04N 1/44* (2006.01)
*H04N 1/32* (2006.01)

(52) U.S. Cl.
CPC ....... *H04N 1/4486* (2013.01); *H04N 1/32128* (2013.01); *H04N 2201/3238* (2013.01); *H04N 2201/3245* (2013.01); *H04N 2201/3252* (2013.01)

(58) Field of Classification Search
CPC .................................................. H04N 1/4486
See application file for complete search history.

(56) References Cited

U.S. PATENT DOCUMENTS

| | | | | |
|---|---|---|---|---|
| 5,862,217 A | * | 1/1999 | Steinberg | H04N 1/4413 348/231.3 |
| 5,901,252 A | * | 5/1999 | Kawakami | G06K 9/4619 345/648 |
| 6,425,081 B1 | * | 7/2002 | Iwamura | 713/176 |
| 6,757,828 B1 | * | 6/2004 | Jaffe | H04N 1/32128 380/200 |
| 6,968,058 B1 | | 11/2005 | Kondoh | |
| 7,436,440 B2 | * | 10/2008 | Tagawa | H04N 5/772 348/231.2 |

(Continued)

OTHER PUBLICATIONS

Ben Gribaudo, "Canon EOS Utility—Automatic Camera Clock Synchronization", URL: (http://www.bengribaudo.com/blog/2011/03/17/874/canon-eos-utility-automatic-camera-clock-synchronization), dated prior to Feb. 16, 2012, pp. 1-3.*

(Continued)

*Primary Examiner* — Simon P Kanaan
(74) *Attorney, Agent, or Firm* — Eschweiler & Potashnik, LLC

(57) ABSTRACT

An apparatus for generating trusted image data includes an image data generator, a processor and an output unit. The image data generator generates image data of an image to be taken of a three-dimensional scene and trust data of the three-dimensional scene. The trust data indicates a depth information of at least one pixel of the image to be taken or comprises data capable of being used to calculate a depth information of at least one pixel of the image to be taken. The processor generates encrypted image data by encrypting at least the trust data or characteristic data derivable from at least the trust data, so that an authentication of the image data is enabled based on the encrypted image data. The output unit provides trusted image data including the encrypted image data.

16 Claims, 7 Drawing Sheets

(56) References Cited

U.S. PATENT DOCUMENTS

| | | | |
|---|---|---|---|
| 7,774,605 B2 | 8/2010 | Kanai | |
| 9,245,344 B2* | 1/2016 | Shim | G06T 5/005 |
| 2004/0264542 A1* | 12/2004 | Kienitz | G01J 5/02 |
| | | | 374/120 |
| 2006/0013473 A1* | 1/2006 | Woodfill | G06K 9/32 |
| | | | 382/154 |
| 2007/0226509 A1* | 9/2007 | Senga et al. | 713/176 |
| 2007/0300074 A1 | 12/2007 | Natter | |
| 2009/0254530 A1* | 10/2009 | Jaffe | G06F 21/64 |
| 2010/0202436 A1* | 8/2010 | Albert | H04J 3/0655 |
| | | | 370/350 |
| 2010/0296441 A1* | 11/2010 | Barkan | H04W 12/08 |
| | | | 370/328 |
| 2013/0262536 A1* | 10/2013 | Avrahami | 707/827 |
| 2013/0307932 A1* | 11/2013 | Mestha | G01S 17/89 |
| | | | 348/46 |
| 2014/0029797 A1* | 1/2014 | Eriksson | A01J 5/0175 |
| | | | 382/103 |

OTHER PUBLICATIONS

Wikipedia, *Kinect*, en.wikipedia.org/wiki/Kinect as available on Apr. 9, 2013, pp. 1-12.

Wikipedia, *Structured-Light 3D Scanner*, en.wikipedia.org/Structured-light_3D_scanner, as available on Apr. 9, 2013, 10 pages.

Wikipedia, *Time-of-flight-camera*, en.wikipedia.org/wiki/Time-of-flight_camera, as available on Apr. 9, 2013, 6 pages.

Friedman, Gary L., *The Trustworthy Digital Camera: Restoring Credibility to the Photographic Image*, last revised Nov. 30, 1994, pp. 1-7.

EAS-Unfallkamera, EAS-Surveillance GmbH, Berlin, Germany, translated by Google Translate on Apr. 18, 2013.

* cited by examiner

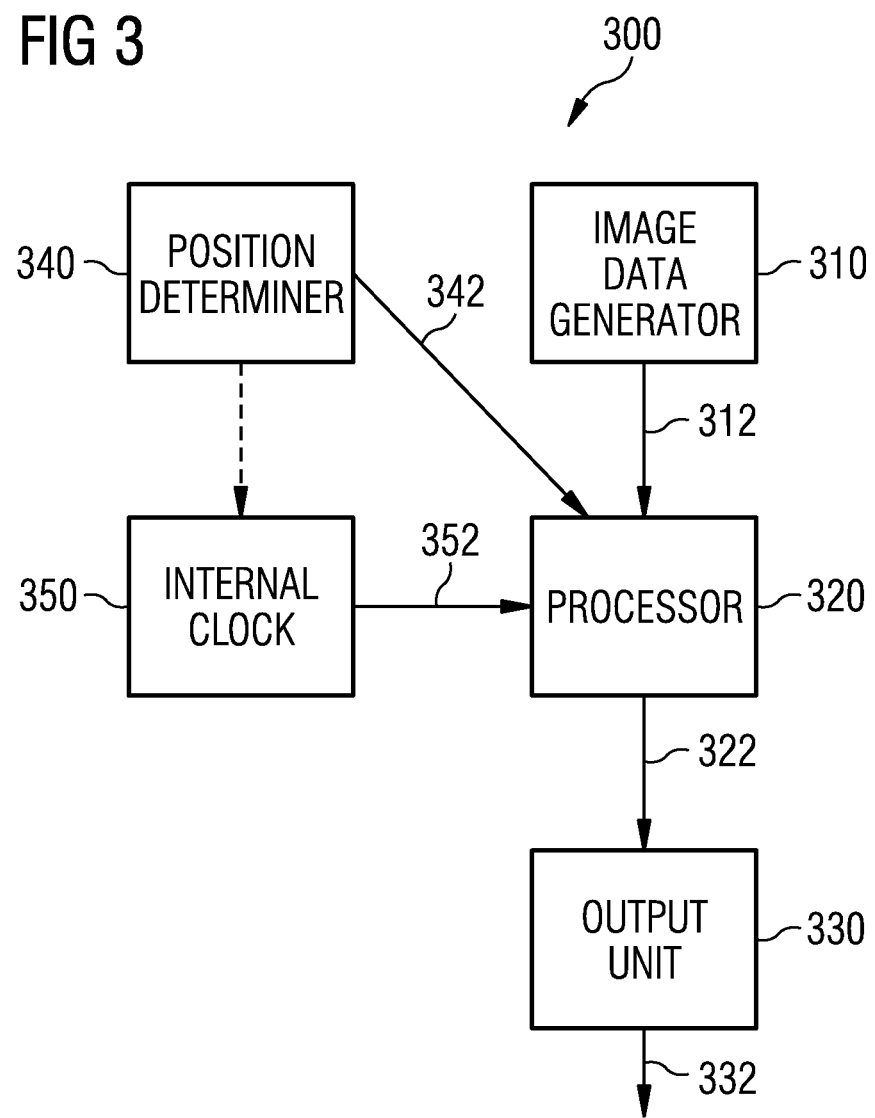

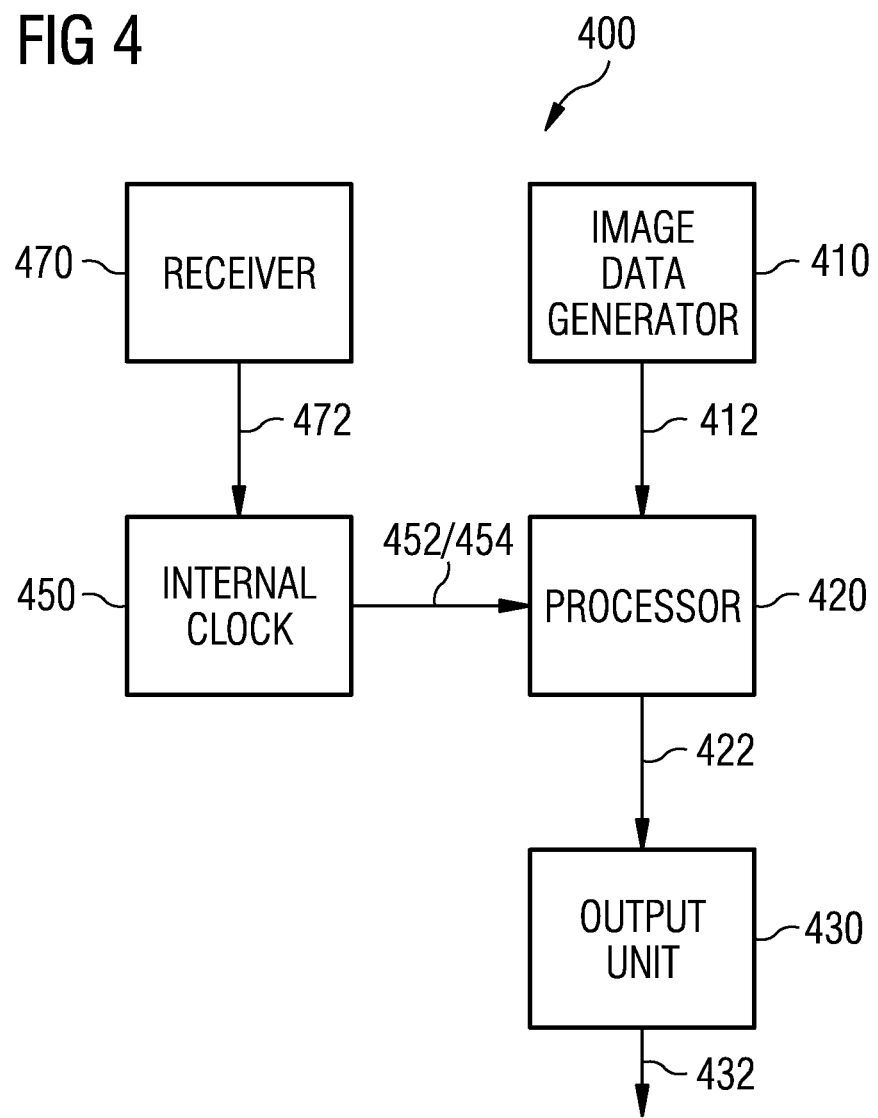

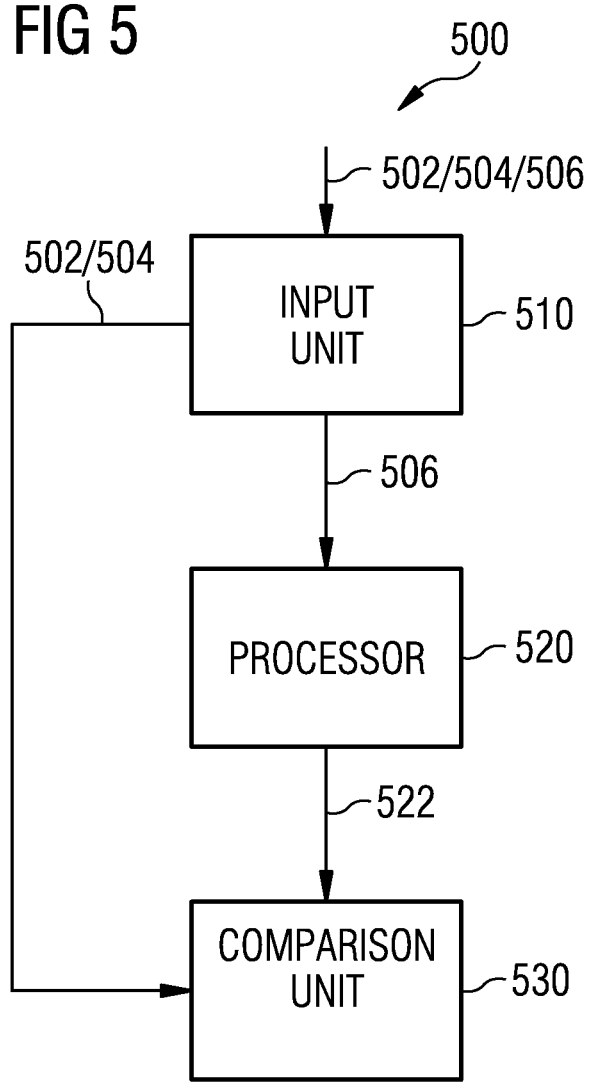

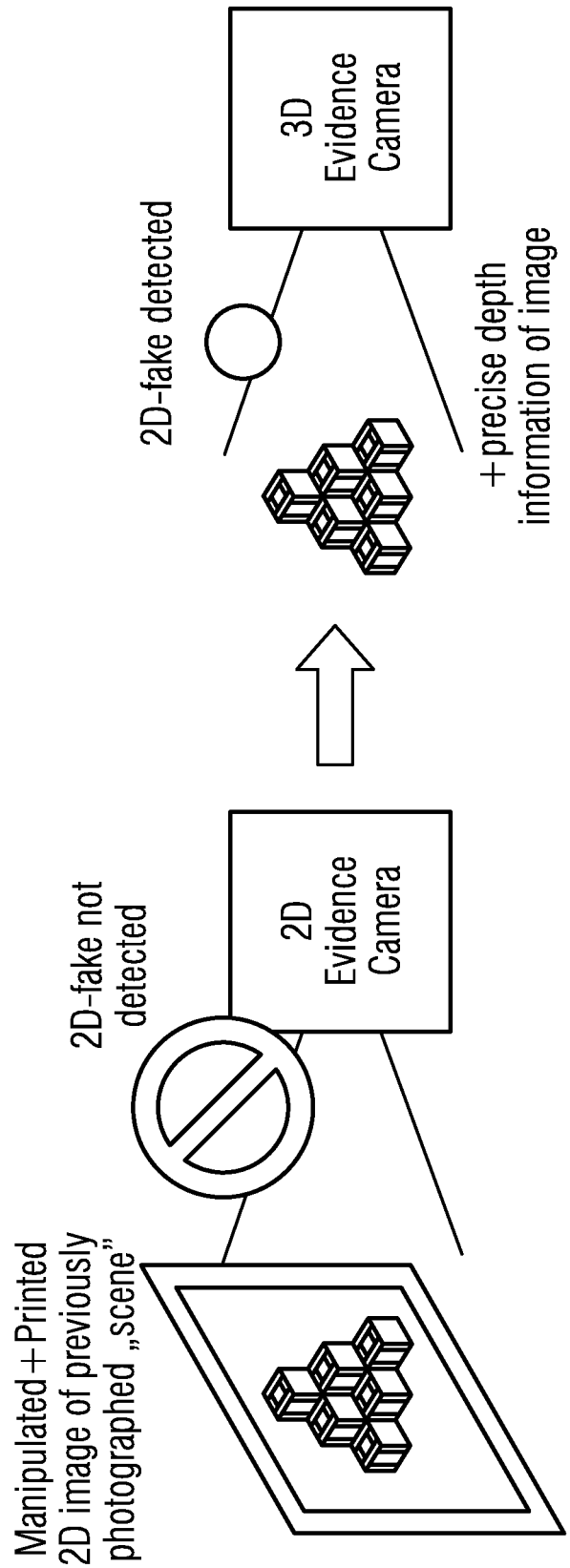

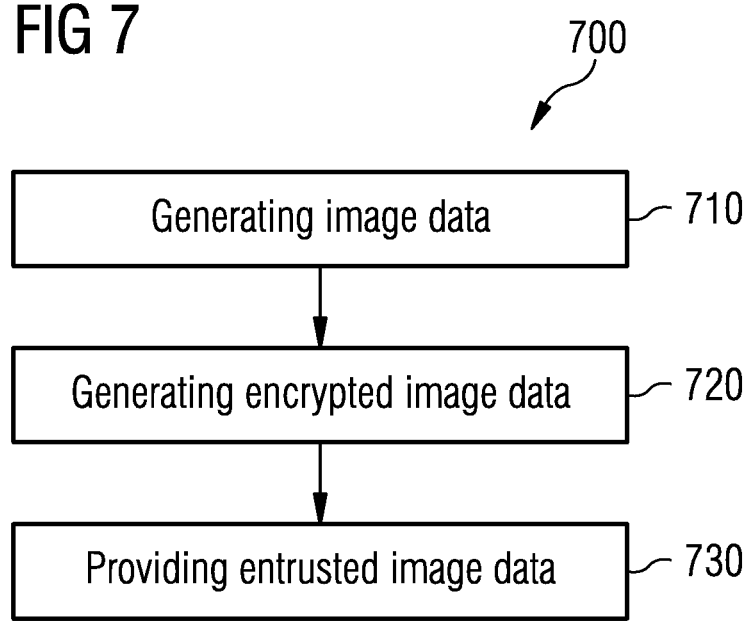

APPARATUS FOR GENERATING TRUSTED IMAGE DATA, AN APPARATUS FOR AUTHENTICATION OF AN IMAGE AND A METHOD FOR GENERATING TRUSTED IMAGE DATA

FIELD

Embodiments relate to the field of trustworthy image generation and in particular to an apparatus for generating trusted image data, an apparatus for authentication of an image and a method for generating trusted image data.

BACKGROUND

The increasing sophistication of computers has made digital manipulation of photographic images easy to perform and, as time goes on, increasingly difficult to detect. Today, the majority of pictures appearing in newspapers and magazines have been digitally altered to some degree. Consequently, the prospect of an individual manipulating images on a computer and presenting them as courtroom evidence is a realistic scenario, for example. Therefore, the generation of trustworthy images is getting more important.

SUMMARY

An embodiment relates to an apparatus for generating trusted image data comprising an image data generator, a processor and an output unit. The image data generator is configured to generate image data of an image to be taken of a three-dimensional scene and trust data of the three-dimensional scene. The trust data indicates a depth information of at least one pixel of the image to be taken or comprises data capable of being used to calculate a depth information of at least one pixel of the image to be taken. Further, the processor is configured to generate encrypted image data by encrypting at least the trust data or characteristic data derivable from at least the trust data, so that an authentication of the image data is enabled based on the encrypted image data. The output unit is configured to provide trusted image data comprising the encrypted image data.

The described concept uses data indicating depth information of the image to be taken in order to increase the trustworthiness of the image data. The depth information or data capable of being used to calculate depth information is taken from the same three-dimensional scene as the image data itself. Since the encrypted image data contains an indication on this depth information, the image data can be authenticated based on the encrypted image data. In this way, images taken from manipulated and printed two-dimensional images of three-dimensional photograph scenes can be distinguished from pictures taken from the three-dimensional scene itself. Therefore, the reliability and trustworthiness of the generated trusted image data can be increased. Therefore, such trusted image data may be useable as courtroom evidence.

Some embodiments further comprise a position determiner configured to determine a position of the apparatus and enable an addition of position data indicating the determined position to the trust data. Further, the apparatus may comprise an internal clock configured to enable to add time data and/or position confidence data to the trust data. The time data indicates a time, the position of the apparatus was determined by the position determiner at last, and/or the position confidence data indicates a confidence level of the determined position based on the time data. In this way, the reliability and trustworthiness of the generated trusted image data can be further improved.

In some embodiments, the apparatus comprises an internal clock configured to enable to add time data indicating a time, the images taken, to the trust data. Further, the apparatus may comprise a receiver configured to receive a clock synchronization signal from an external clock. The internal clock may be configured to be synchronized with the external clock based on the clock synchronization signal. The internal clock may be further configured to enable to add synchronization data and/or time confidence data to the trust data. The synchronization data indicates a time, the time of the internal clock was synchronized at last, and/or the time confidence data indicates a confidence level of the time data based on the synchronization data. In this way, the reliability and trustworthiness of the generated trusted image data can be further increased.

Some embodiments relate to an apparatus for generating trusted image data comprising an image data generator, a position determiner, an internal clock, a processor and an output unit. The image data generator is configured to generate image data of an image to be taken from a scene and the position determiner is configured to determine a position of the apparatus and provide trust data indicating the determined position. The internal clock is configured to enable to add time data or position confidence data to the trust data. The time data indicates a time, the position of the apparatus was determined by the position determiner at last, or the position confidence data indicates a confidence level of the determined position based on the time data. Further, the processor is configured to generate encrypted image data by encrypting at least the trust data or characteristic data derivable from at least the trust data, so that an authentication of the image data is enabled based on the encrypted image data. The output unit is configured to provide trusted image data comprising the encrypted image data.

Due to the time data or the position confidence data, an assessment of the time delay between the time, the position of the apparatus was lastly determined, and the time, the image was taken, can be done. If these events are close to each other, it is believable that the apparatus was at the determined position at the time the image was taken. In this way, the reliability or trustworthiness of the generated trusted image data can be increased.

Some further embodiments relate to an apparatus for generating trusted image data comprising an image data generator, an internal clock, a receiver, a processor and an output unit. The image data generator is configured to generate image data of an image to be taken from a scene and the internal clock is configured to provide trust data representing time data indicating a time, the image is taken. The receiver is configured to receive a clock synchronization signal from an external clock. The internal clock is configured to be synchronized with the external clock based on the clock synchronization signal. Further, the internal clock is configured to enable to add synchronization data or time confidence data to the trust data. The synchronization data indicates a time, the time of the internal clock was synchronized at last, or the time confidence data indicates a confidence level of the time data based on the synchronization data. Further, the processor is configured to generate encrypted image data by encrypting at least the trust data or characteristic data derivable from at least the trust data so that an authentication of the image data is enabled based on the encrypted image data. The output unit is configured to provide trusted image data comprising the encrypted image data.

Due to the synchronization data or time confidence data, an assessment of the time delay between the time, the internal clock was lastly synchronized with the external clock, and the time, the image was taken, can be done. If these events are close to each other, it is believable that the image was taken at the indicated time. In this way, the reliability or trustworthiness of the generated trusted image data can be increased.

Further embodiments relate to an apparatus for an authentication of an image comprising an input unit, a processor and a comparison unit. The image unit is configured to receive image data of an image to be authenticated, current trust data of the image to be authenticated and encrypted image data. The current trust data comprises a depth information of at least one pixel of the image to be authenticated or comprises data capable of being used to calculate a depth information of at least one pixel of the image to be authenticated or comprises characteristic data derived from at least a depth information of at least one pixel of the image to be authenticated or derived from data capable of being used to calculate a depth information of at least one pixel of the image to be authenticated. Further, the processor is configured to decrypt the encrypted image data to obtain image data of the image to be authenticated generated at the time it was taken, original trust data of the image to be authenticated generated at the time it was taken or characteristic data derived from the image data of the image to be authenticated generated at the time it was taken and original trust data of the image to be authenticated generated at the time it was taken. The original trust data comprises a depth information of at least one pixel of the image to be authenticated generated at the time it was taken or comprises data capable of being used to calculate a depth information of at least one pixel of the image to be authenticated generated at the time it was taken. Further, the comparison unit is configured to compare the image data of the image to be authenticated with the image data of the encrypted image, the current trust data with the original trust data or the characteristic data contained by the current trust data with the encrypted characteristic data.

The apparatus is able to identify manipulations or alterations of the image data of an image to be authenticated. For example, images taken from a two-dimensional printout of a three-dimensional scene can be distinguished from images taken from the three-dimensional scene itself due to the depth information.

BRIEF DESCRIPTION OF THE DRAWINGS

Some embodiments of apparatuses and/or methods will be described in the following by way of example only, and with reference to the accompanying figures, in which

FIG. 3 shows a block diagram of another apparatus for generating trusted image data;

FIG. 4 shows a block diagram of another apparatus for generating trusted image data;

FIG. 5 shows a block diagram of an apparatus for an authentication of an image;

FIG. 6 shows a schematic illustration of an image fake protection; and

FIG. 7 shows a flow diagram of a method for generating trusted image data.

DETAILED DESCRIPTION

Various example embodiments will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1:
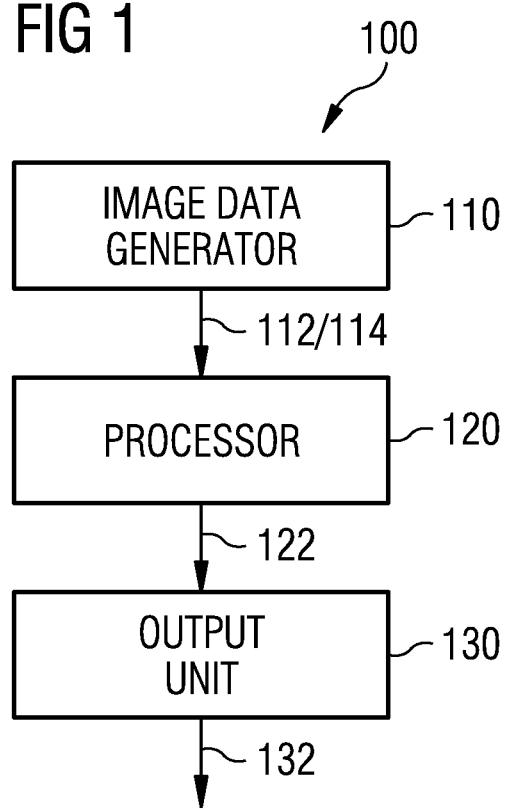
FIG. 1 shows a block diagram of an apparatus for generating trusted image data.

FIG. 1 shows a block diagram of an apparatus 100 for generating trusted image data 132 according to an embodiment. The apparatus 100 comprises an image data generator 110 connected to a processor 120 and an output unit 130 connected to the processor 120. The image data generator 110 generates image data 112 of an image to be taken of a three-dimensional scene and trust data 114 of the three-dimensional scene. The trust data 114 indicates a depth information of at least one pixel of the image to be taken or comprises data capable of being used to calculate a depth information of at least one pixel of the image to be taken. Further, the processor 120 generates encrypted image data 122 by encrypting at least the trust data 114 or characteristic data derivable from at least the trust data 114, so that an authentication of the image data 112 is enabled based on the encrypted image data 122. The output unit 130 provides trusted image data 132 comprising the encrypted image data 122.

The described apparatus 100 uses data indicating depth information of the image to be taken in order to increase the trustworthiness of the image data. The depth information or data capable of being used to calculate depth information is taken from the same real or actual three-dimensional scene as the image data 112 itself. Since the encrypted image data 122 contains an indication on this depth information, the image data 112 can be authenticated based on the encrypted image data 122. In this way, images taken from manipulated and printed two-dimensional images of three-dimensional photograph scenes can be distinguished from pictures taken from the three-dimensional scene itself. Therefore, the reliability and trustworthiness of the generated trusted image data 132 can be increased. Therefore, such trusted image data 132 may be useable as courtroom evidence.

The image data generator 110 may generate the image data 112 and the trust data 114 in various ways. The image data generator 110 may comprise a camera for taking images of a three-dimensional scene (e.g. CCD, Charge Coupled Device, CMOS, Complementary Metal Oxide Semiconductor device, or ToF, Time-of-Flight Sensor). The image data may comprise information on each pixel of the sensor of the camera of the image data generator 110 or may comprise compressed information (e.g. JPEG or TIFF format) of the pixels of the sensor of the image data generator. Independent from the data format, the image data represents an image taken from a three-dimensional scene. A pixel of an image may correspond to a light sensitive cell of a cell array of a sensor of a camera or a smallest or predefined individual entity of an image, for example. For this image data, additional data is obtained in terms of the trust data of the three-dimensional scene to enable an authentication of the image data (e.g. to detect manipulations of the image data).

For this, the image data generator 110 may generate depth information of the three-dimensional scene, the image is taken from. This depth information can be obtained in various ways. For example, the distances to one or more objects of the three-dimensional scene are measured and assigned to corresponding pixels of the taken image or to corresponding parts of the taken image. Alternatively or additionally, an individual depth information is obtained for a plurality of pixels of the taken image or for all pixels of the taken image (e.g. by a Time-of-Flight camera). Alternatively or optionally, the depth information may comprise an average depth measured between objects of the three-dimensional scene and the apparatus 100 or may be obtained for a plurality of pixels or all pixels of the taken image.

Alternatively, it may be also sufficient to generate data suitable for calculating a depth information of at least one pixel of the image to be taken. For example, a stereoscopic camera takes two images from different view angles of the same three-dimensional scene. The second image data is capable of being used to calculate a depth information of at least pixel of the first taken image in combination with the image data of the first image. Alternatively, the distance to objects of the three-dimensional scene can be measured by a measurement unit located near the apparatus. Then, a depth information of at least one pixel, a plurality of pixels or all pixels of the taken image or of a part or a plurality of parts of the taken image can be calculated, if the distance between the measurement unit and the apparatus 100 is known. The measurement unit may be part of the image data generator 110 or an external unit connectable to the image data generator 110 (e.g. wireless or wired).

The depth information may be a relative depth between different objects of the three-dimensional scene or may be an absolute depth between an object of the three-dimensional scene and the apparatus 100. In other words, the trust data 140 may comprise absolute depth information of at least one pixel of the image to be taken or comprises data capable of being used to calculate absolute depth information of at least one pixel of the image to be taken, for example.

The three-dimensional scene may be an arbitrary environment, a trusted image should be taken from (e.g. photographic evidence image of an accident).

As already mentioned, the image data generator 110 may comprise a Time-of-Flight camera, for example. This Time-of-Flight camera may generate two dimensional image data 112 (e.g. raw or compressed data) of the image to be taken and trust data 114 indicating depth information for a plurality of pixels or each pixel of the image to be taken. By using a Time-of-Flight camera, an absolute depth information of pixels of the image to be taken can be obtained automatically. In this way, the image data 112 and the trust data 114 can be generated quickly and reliably.

Alternatively, it could be a 3D sensor technology based on a structured light scanner principle. In other words, the image data generator may comprise a 3D-depth sensor system based on structured-light principle.

Alternatively, the image generator 110 may comprise a stereoscopic camera, for example. This stereoscopic camera may generate image data 112 of a first image to be taken of the three-dimensional scene and image data of a second image to be taken of the three-dimensional scene. These two images are taken from different view angles. At least a part of the image data of the second image may be used as trust data 114, since the image data of the second image or at least a part of this image data is suitable or can be used for calculating a depth information of at least one pixel of the image to be taken. In other words, at least a part of the image data of the second image represents data capable of being used to calculate a depth information of at least one pixel of the image to be taken. Further, the two images provide the possibility of reproducing the three-dimensional image of a three-dimensional scene by a display for an observer or user.

However, the described concept may work with any type of 2D and 3D image-sensor variants or principles. In other words, it may be independent of the used sensor technology, as long as at least an information on a 2D and 3D representation of the scene may be recorded (e.g. at the same time or nearly the same time).

The processor 120 encrypts at least the trust data 114 or characteristic data derivable from at least the trust data 114. The encryption can be done in various ways (e.g. by using a symmetric or asymmetric encryption algorithm). A manipulation of at least the encrypted data 132 after encrypting can be avoided as far as the used encryption algorithm is secure or reliable.

It may be sufficient to encrypt the trust data 114 or characteristic data derivable from the trust data 114, since the depth information contained by the trust data 114 may not fit to image data of a taken image, if the image data was altered or manipulated. Additionally, also the image data or characteristic data derivable from the image data may be optionally encrypted for generating the encrypted image data. In this way, also the original image data can be reproduced by decrypting the encrypted image data 122, so that the manipulation or alteration of image data can be discovered by a comparison with the decrypted image data.

The processor 120 may encrypt the trust data 114 or the image data 112 and the trust data 114 itself or may calculate characteristic data derivable from the trust data 114 or derivable from the image data 112 and the trust data 114. By using characteristic data, the amount of data of the encrypted image data may be significantly reduced. For example, the processor 120 may generate characteristic data derivable from the image data 122 and/or the trust data 114 by calculating hash data based on the image data 112 and/or the trust data 114. For this, the processor 120 may apply a suitable hash function to the image data 112 and/or the trust data 114. For example, a hash is a mathematical function which maps values from a large domain into a smaller range. An example may be a hash algorithm dividing a binary file (e.g. image data and/or trust data) into a collection of smaller pieces and performing a cumulative exclusive OR function between successive pieces, producing a hash that is smaller than the original file yet is practically unique to it. Changing a single bit in the original message may produce a very different hash output and reverse engineering a message so it will have a given hash value and also make sense to the reader may be virtually impossible. This characteristic data can be encrypted by the processor 120 to obtain a digital signature of the trust data 114 and/or the image data 112 of the image to be taken, for example.

The processor 120 may use an asymmetric encryption algorithm to encrypt and/or digitally sign at least the trust data 114 or characteristic data derivable from at least the trust data 114 (e.g. public key encryption, elliptic curve cryptography, Rivest-Shamir-Adleman-Encryption).

For example, the apparatus 100 or the processor 120 itself may optionally comprise a memory unit configured to store a private key of an encryption algorithm used by the processor 120 for generating the encrypted and/or digitally signed image data 122. The trust data 114 and/or the image data 112 and the trust data 114 or the characteristic data can be encrypted by using the private key. The obtained encrypted image data 122 can be used for authenticating the image data later on. For this, the public key can be used to decrypt the encrypted image data 122. This decrypted image data can be compared to the image data to be authenticated or data derived from the image data to be authenticated. In this way, manipulations or alterations of the image data can be identified.

The output unit 130 may provide trusted image data 132 comprising the encrypted image data 122. The encrypted image data 122 can be used for an authentication of the image data 122 of a taken image. The output unit 130 may provide the encrypted image data 122 in a format readable by an apparatus for authentication. The encrypted image data 132 may be provided to a memory unit to be stored for later use.

Further, the output unit 114 may provide optionally the image data 112 of a taken image of a three-dimensional scene and/or trust data 114 of the three-dimensional scene. The image data 112 of the taken image and/or the trust data 114 of the taken image can be stored by a memory unit or displayed by a display unit. Later on, a manipulation or alteration of the provided image data 112 and/or trust data 114 may be identified by using the encrypted image data 122.

The output unit 130 may be an output interface of the processor 120 or a memory unit configured to store data provided by the processor 120 and may provide stored data, for example.

Optionally, additionally or alternatively to one or more aspects mentioned above, the image data generator 110 may comprise a camera. This camera may generate the image data 112 of the image to be taken and trust data 114 indicating depth information for at least one pixel, for a plurality of pixels or for each pixel of the image to be taken and at least one parameter of the camera. The parameter of the camera may enable a computation of absolute depth information (e.g. distance between the camera and an object of the three-dimensional scene) of at least one pixel of the image to be taken. In other words, a camera may comprise several adjustment possibilities to vary properties of the camera (e.g. view angle or magnification). Such parameters (e.g. focus, lens parameter, magnification, aperture or modulation parameters for Time-of-Flight cameras) may be used for calculating an absolute distance between the camera and an object of a three-dimensional scene, the image is taken from. In this way, an absolute depth information can be calculated based on the encrypted image data 122 to verify a depth information of the image to be authenticated.

Further, optionally, additionally or alternatively to one of the aspects mentioned above, the apparatus 100 may further comprise one or more additional sensors comprising a compass or a three-dimensional angle sensor, for example. Such a sensor may determine additional orientation data indicating an orientation of the apparatus 100, for example. This additional data may be added to the trust data 114 in order to further improve the reliability or trustworthiness of the encrypted image data.

Optionally, additionally or alternatively to one or more aspects mentioned above, the apparatus 100 may further comprise a position determiner. The position determiner may determine a position of the apparatus 100 and enable an addition of position data indicating the determined position to the trust data 114. In other words, the apparatus 100 may add geographic information of the position of the apparatus 100 at the time an image is taken or a last-known position of the apparatus 100 to the trust data 114. In this way, it may be verified that the apparatus 100 was in the proximity of the three-dimensional scene of the image to be taken at the time the image was taken. Therefore, the trustworthiness or reliability of the authentication of the image can be improved.

Additionally, the apparatus 100 may comprise an optional internal clock. This internal clock may enable (e.g. provide or add directly) to add time data or position confidence data to the trust data 114. In this connection, the time data indicates a time, the position of the apparatus was determined by the position determiner at last (e.g. before the image was taken), or the position confidence data indicates a confidence level of the determined position based on the time data. In other words, the position determiner may determine the position of the apparatus 100 repeatedly. Each time the position determiner (e.g. global positioning system based position determiner or radio navigation based position determiner) determines the position of the apparatus 100, the internal clock may provide time data indicating the time of determining the position of the apparatus 100. This time data can be added to the trust data 114, so that it can be verified that the camera 100 was near the three-dimensional scene on the image at the time or close to the time the image was taken. However, the position determiner may not be able to determine the position of the apparatus 100 every time or at the time the image is taken (e.g. connection to navigation satellites or navigation network is lost or the power supply is low). In this case, the time, the position of the apparatus 100 was determined lastly, may be a long time before the image was taken. Therefore, the reliability of the position of the apparatus 100 is lower than a position determined at the time the image is taken. So, position confidence data can be added to the trust data 114 which indicates a confidence level of the determined position. The confidence level may be a parameter which is low for a position determined long before the image was taken and is high for a position determined at the time the image was taken. In this way, the reliability or trustworthiness of the trusted image data 132 can be increased. The internal clock may be configured so that a user manipulation of the time determined or generated by the internal clock can be avoided.

Optionally, additionally or alternatively to one or more aspects mentioned above, the apparatus 100 may comprise an internal clock configured to enable (e.g. to provide or to add directly) to add time data indicating a time, the image is taken, to the trust data 114. In other words, the time an image is taken may be determined by an internal clock and may be part of the trust data 114. In this way, the time, the image was taken, can be verified based on the encrypted image data containing information of the time data 122 provided or added by the internal clock. In this way, the reliability or trustworthiness of the trusted image data 132 can be increased.

Optionally or alternatively, if the information on the 2D image (image data) and 3D image (depth information) are not sampled (almost) simultaneously (e.g. maybe if the technical realization of the system can only sample the images consecutively) but e.g. with some seconds difference, an additional parameter may be added to the trusted meta-data (trust data), representing both, the 2D and 3D sample time-stamps separately (or the time-difference as a parameter).

In other words, optionally, additionally or alternatively to one or more aspects mentioned above, the apparatus 100 may comprise an internal clock configured to enable (e.g. to provide or to add directly) to add time data indicating a time, the image is taken and a time the depth information of the at least one pixel of the image to be taken or the image is taken and the data capable of being used to calculate the depth information of the at least one pixel of the image to be taken is generated, to the trust data 114.

For example, this might be important when recording fast moving objects (e.g. traffic scene). However, for such use cases, also a camera technology can be used which is able to record 2D and 3D at almost the same time.

Additionally, the apparatus 100 may comprise an optional receiver. This receiver may receive a clock synchronization signal from an external clock (e.g. DCF77, Mobile Provider or NTP, Network Time Protocol or GPS-time-signal, global positioning system time signal). The internal clock may be synchronized with the external clock based on the clock synchronization signal. In this way, accurate time data may be provided by the internal clock. The internal clock may enable (e.g. provide or add) to add synchronization data or time confidence data to the trust data 114. The synchronization data may indicate the time, the time of the internal clock was synchronized at last (e.g. before the image was taken). The time confidence data may indicate a confidence level of the time data based on the synchronization data.

In other words, the internal clock may be synchronized with the external clock repeatedly. Each time the internal clock is synchronized, the internal clock may provide time data indicating the time of synchronization. This time data can be added to the trust data 114, so that it can be verified that the image was taken at the indicated time. However, the internal clock may not be able to be synchronized every time or at the time the image is taken (e.g. connection to external clock is lost or the power supply is low). In this case, the time, the synchronization was done lastly, may be a long time before the image was taken. Therefore, the reliability of the time data indicating the time, the image was taken, is lower than time data of a clock synchronized at the time, the image is taken. So, time confidence data can be added to the trust data 114 which indicates a confidence level of the time data. The confidence level may be a parameter which is low for a synchronization done long before the image was taken and is high for a synchronization done at the time the image was taken. In this way, the reliability or trustworthiness of the trusted image data 132 can be increased.

The image data generator 110, the processor 120, the output unit 130, the internal clock, the position determiner and/or the receiver may be independent hardware units or part of a processor, a microcontroller or a digital signal processor as well as a computer program or software product suitable for providing the corresponding functionality.

Figure 2:
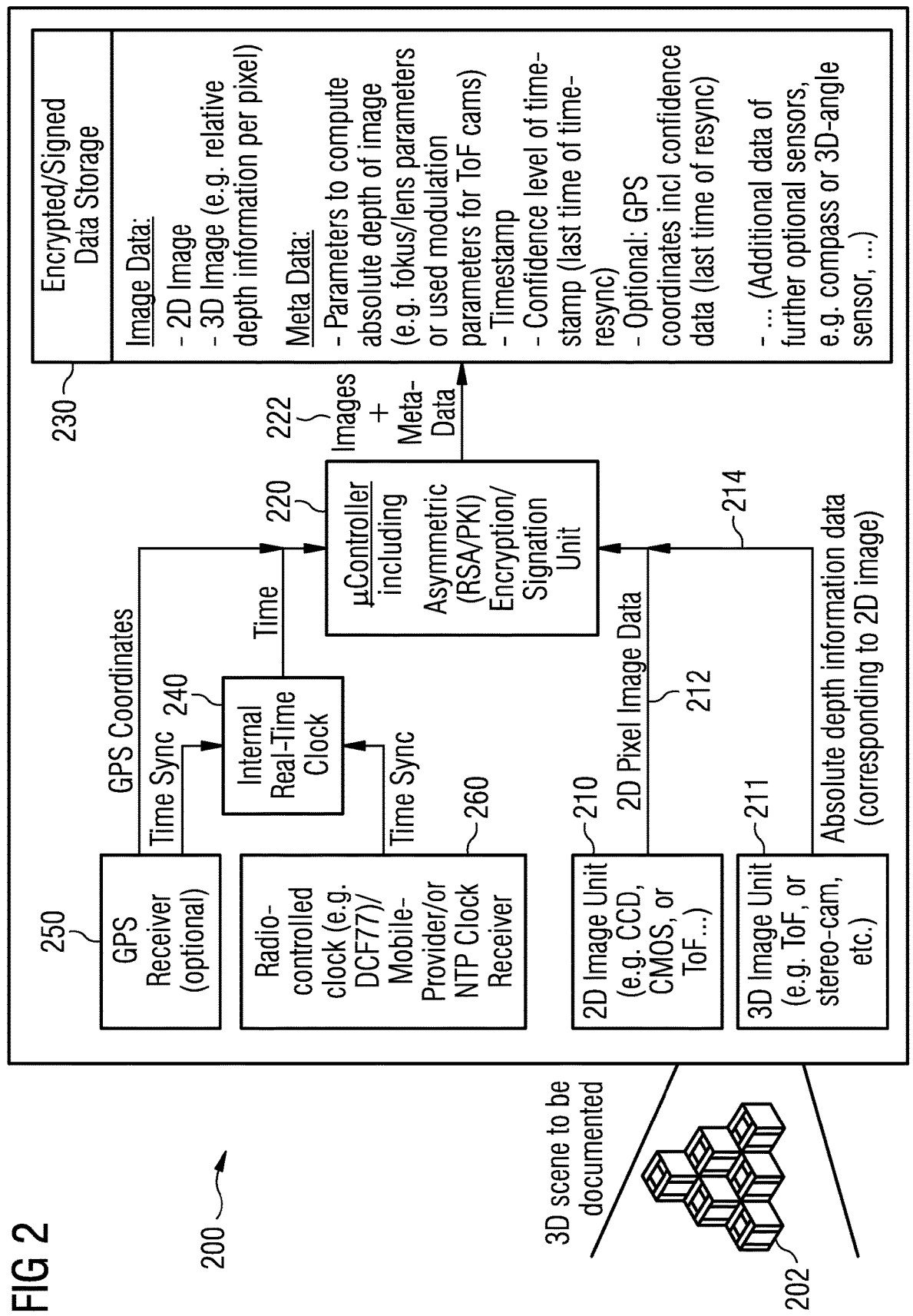
FIG. 2 shows a block diagram of another apparatus for generating trusted image data.

FIG. 2 shows a block diagram of an apparatus 200 for generating trusted image data according to an embodiment. The apparatus 200 may comprise an image data generator with a 2D-image-unit 210 (e.g. CCD, CMOS or ToF) and/or a 3D-image-unit 211 (e.g. ToF or stereo-cam). The 2D-image-unit 210 may provide image data represented by 2D-pixel-image-data 212 (two-dimensional) of a 3D scene 202 (three-dimensional) to be documented to a processor 220. Further, the 3D-image-unit 211 may provide trust data represented by absolute depth information data 214 (corresponding to 2D-image) to the processor 220.

The processor 220 may be a microcontroller (g-controller) including an asymmetric encryption/signation unit (e.g. RSA, PKI). Further, an internal real-time clock 240 may be connected to the processor 220 and may provide time data representing or indicating a time an image is taken to that processor 220 as an addition to the trust data 214. Further, the apparatus 200 may comprise a GPS-receiver 250 (global positioning system), which may provide GPS coordinates of the apparatus to the processor 220 as an addition to the trust data 214. Additionally, the GPS receiver 250 may provide a time synchronization signal to the internal real-time clock 240 at the time, the position of the apparatus is determined and the internal real-time clock 240 may provide time data indicating a time, the position was determined, to the processor 220 as an addition to the trust data 214. Further, the apparatus 200 may comprise a receiver 260 for a radio-controlled clock (e.g. DCF 77), a mobile provider or an NTP clock receiver, which provides a time synchronization signal to the internal real-time clock 240. Based on this time synchronization signal, the internal real-time clock 240 may be synchronized with an external clock. Further, the internal real-time clock 240 may provide time data indicating a time of the last time synchronization to the processor 220 as an addition to the trust data 214.

The processor 220 may generate encrypted image data 222 by encrypting images (e.g. two-dimensional or three-dimensional image data) and meta-data (e.g. the trust data, time data, position data, position confidence data, synchronization data and/or time confidence data). The apparatus 200 may further comprise an output unit 230 with encrypted or signed data storage for storing image data representing a 2D-image or a 3D-image (e.g. relative depth information per pixel) and/or meta-data representing parameters to compute absolute depth of image (e.g. focus or lens parameters or used modulation parameters for ToF cams), a time stamp, a confidence level of time stamp (e.g. last time of time resynch), optional GPS coordinates including confidence data (e.g. last time of resynch) and/or additional data of further optional sensors (e.g. compass or 3D-angle sensor). Further, the output unit 230 may provide the image data and/or meta-data.

FIG. 3 shows a block diagram of an apparatus 300 for generating trusted image data 332 according to an embodiment. The apparatus 300 comprises an image data generator 310, a processor 320, an output unit 330, a position determiner 340 and an internal clock 350. The image data generator 310, the position determiner 340 and the internal clock 350 are connected to the processor 320. The processor 320 is connected to the output unit 330. The image data generator 310 may generate image data 312 of an image to be taken from a scene (e.g. two-dimensional or three-dimensional scene). The position determiner 340 determines a position of the apparatus 300 and provides trust data 342 indicating the determined position to the processor 320. The internal clock 350 enables to add time data or position confidence data 352 to the trust data 342. The time data indicates a time, the position of the apparatus 300 was determined by the position determiner 340 at last, or the position confidence data indicates a confidence level of the determined position based on the time data. The processor 320 generates encrypted image data 322 by encrypting at least the trust data 342, 352 or characteristic data derivable from at least the trust data 342, 352, so that an authentication of that image data 312 is enabled based on the encrypted image data 322. The output unit 340 provides trusted image data 332 comprising the encrypted image data 322.

The apparatus 300 may add geographic information of the position of the apparatus 300 at the time an image is taken or a last-known position of the apparatus 100 to the trust data 114. In this way, it may be verified that the apparatus 100 was in the proximity of the three-dimensional scene of the image to be taken at the time the image was taken. Therefore, the trustworthiness or reliability of the authentication of the image can be improved.

The comments and explanations provided above in connection with a position determiner, an internal clock, time data and/or position confidence data are correspondingly applicable or valid.

The apparatus 300 may comprise one or more additional or optional features corresponding to one or more aspects mentioned in connection with the concept or an embodiment described above.

FIG. 4 shows a block diagram of an apparatus 400 for generating trusted image data 432 according to an embodiment. The apparatus 400 comprises an image data generator 410, a processor 420, an input unit 430, a receiver 470 and an internal clock 450. The image data generator 410 and the internal clock 450 are connected to the processor 420. Further, the receiver 470 is connected to the internal clock 450 and the processor 420 is connected to the output unit 430. The image data generator 410 generates image data 412 of an image to be taken from a scene (e.g. two-dimensional or three-dimensional scene). The internal clock 450 provides trust data 452 representing time data indicating a time, the image is taken. Further, the receiver 470 receives a clock synchronization signal 472 from an external clock. The internal clock 450 is synchronized with the external clock based on the clock synchronization signal 472. Further, the internal clock enables to add synchronization data or time confidence data 454 to the trust data 452. The synchronization data indicates a time, the time of the internal clock was synchronized at last, or the time confidence data 454 indicates a confidence level of the time data based on the synchronization data. The processor 420 generates encrypted image data 422 by encrypting at least the trust data 452 or characteristic data derivable from at least the trust data 452, so that an authentication of the image data is enabled based on the encrypted image data 422. Additionally, the output unit 430 provides trusted image data 432 comprising the encrypted image data 422.

Additionally, comments or explanations given above in connection with an internal clock, a receiver, a clock synchronization signal, synchronization date or time confidence data may be correspondingly applicable or valid.

The apparatus 400 may comprise one or more optional or additional features corresponding to one or more aspects of the described concept or embodiments described above.

FIG. 5 shows a block diagram of an apparatus 500 for an authentication of an image according to an embodiment. The apparatus 500 comprises an input unit 510, processor 520 and a comparison unit 530. The input unit 510 is connected to the processor 520 and the comparison unit 530. The processor 520 is connected to the comparison unit 530. The input unit 510 receives image data 502 of an image to be authenticated, current trust data 504 of the image to be authenticated and encrypted image data 506. The current trust data 504 comprises a depth information of at least one pixel of the image to be authenticated or comprises data capable of being used to calculate a depth information of at least one pixel of the image to be authenticated or comprises characteristic data derived from at least a depth information of at least one pixel of the image to be authenticated or derived from data capable of being used to calculate a depth information of at least one pixel of the image to be authenticated. Further, the processor 520 decrypts the encrypted image data 506 to obtain image data 522 of the image to be authenticated generated at the time it was taken, original trust data of the image to be authenticated generated at the time it was taken or characteristic data derived from the image data of the image to be authenticated generated at the time it was taken and original trust data of the image to be authenticated generated at the time it was taken. The original trust data comprises the depth information of at least one pixel of the image to be authenticated generated at the time it was taken or comprises data capable of being used to calculate a depth information of at least one pixel of the image to be authenticated generated at the time it was taken. Additionally, the comparison unit 540 compares the image data 502 of the image to be authenticated with the image data of the encrypted image, the current trust data 504 with the original trust data 504 or the characteristic data contained by the current trust data with the encrypted characteristic data, so that an alteration of the image data 502 of the image to be authenticated is detectable.

The apparatus 500 is able to identify manipulations or alterations of the image data of an image to be authenticated. For example, images taken from a two-dimensional printout of a three-dimensional scene can be distinguished from images taken from the three-dimensional scene itself due to the depth information.

For example, the digital signature (e.g. image data, trust data and/or characteristic data) may be authenticated or verified (e.g. by using the public key of the camera).

Additionally, comments or explanations given above in connection with image data, trust data, encrypted image data, characteristic data and so on may be correspondingly applicable or valid.

Further, the apparatus 500 may comprise one or more additional optional features corresponding to one or more aspects mentioned in connection with the proposed concept or an embodiment described above.

Some embodiments relate to a trusted 2D/3D evidence camera with integrated image-fake protection. Such a camera may be able to take and save 2D (and optionally 3D) images with an apparatus which technically ensures the authenticity of the recorded scenery. In this way, it may not only be ensured that the 2D image has not been manipulated after recording, but additionally—by providing the additional 3D information (depth information)—it may be ensured that the taken 2D image is not faked by photographing a printed (and manipulated) image of the 2D scene instead of the actual real 3D scene. Additionally, the saved 3D information can be used to provide information about the absolute distance and/or size of objects.

The proposed concept is not limited to 2D imaging only. Therefore, it can provide that a 2D image of a scene was taken and not manipulated and not be faked. For example, with good quality printout and lighting a 2D image of a scene can be manipulated, then printed and then again photographed with a 2D evidence camera (in principle, shooting this fake photo may be also possibly at the defined GPS position), but not with the proposed concept. With the additional 3D information (depth information) of the proposed concept, this issue can be avoided and it additionally may deliver more precise 3D distance information of the scene.

FIG. 2 depicts an example of main components of a proposed evidence-camera system. As already mentioned, the system may comprise a 2D imager, a real-time clock, an optional GPS receiver and a microcontroller (processor) including some implementation of an asymmetric encryption unit. The digital encryption/signature may be correspondingly implemented. A private key may be (e.g. once) generated in the camera, the public key can be exported to a PC, for example, in order to decrypt/verify the image and/or meta-data. The keys could be stored in a write-only memory in order to be manipulation free. From then, all images and/or meta-data may be encrypted and/or signed with the same unique private key, for example. If necessary, for high security the key could be hardware protected against readout with high security circuits or chips.

Further, the evidence camera system includes 3D image-data which may add absolute depth information exactly corresponding to the 2D image, for example. This could be by using a Time-of-Flight (ToF) camera system, but not necessarily (e.g. could also be other related 3D imaging systems). The 3D system may be able to provide data (or meta-data) in order to re-compute the absolute depth information of the 2D image pixels. Not just a grey scale image of the relative depth information per pixel may be stored, for example. Therefore, in the case of a ToF camera, the used modulation and/or calibration parameters may be stored in the meta-data in order to compute the absolute depth of the pixels (or in the case of a stereo camera, e.g. focus and/or lens settings may be stored). For example, the proposed concept may implement a ToF 3D imaging device.

An additional feature of a proposed system may be the combination of an internal real-time clock (RTC) and external precise time calibration receivers and/or the computation of the corresponding meta-data which may describe the confidence level of the saved time stamp (e.g. confidence and/or precision level, if the resynchronization was long ago, so in order to be as exact as possible, this parameter can be added, for example). The user may not be allowed to set the time manually. Additionally, a similar confidence level can be saved for the "optional" GPS coordinate data.

According to the described concept, a 3D information (depth information) can be added to 2D evidence cameras in order to avoid a situation depicted in FIG. 6. With a 2D evidence camera a 2D fake of a manipulated and printed 2D image of a previously photographed scene may not be detected. By using a 3D evidence camera (by adding depth information to the trust data) a 2D fake can be detected due to precise depth information of an image. However, the 3D information may not only be useful for fake protection, but provides additional depth and/or size information of the photographed scene.

A reconstruction or computation of such depth information from 2D pictures after the event may be impossible or may require high effort, also if the sizes of different objects are known. The presented fake detection may be possible with a proposed camera.

The proposed concept can be used independently of the 3D imaging principle, e.g. ToF or other alternatives may be used. By using a Time-of-Flight principle 3D imaging sensor, the depth information may be provided directly per pixel correlated to the 2D pixels without the need for complex computing algorithms or computing power, for example.

FIG. 7 shows a flowchart of a method 700 for generating trusted image data according to an embodiment. The method 700 comprises generating 710 image data of an image to be taken of a three-dimensional scene and trust data of the three-dimensional scene. The trust data indicates a depth information of at least one pixel of the image to be taken or comprises data capable of being used to calculate the depth information of at least one pixel of the image to be taken. Further, the method 700 comprises generating 720 encrypted image data by encrypting at least the trust data or characteristic data derivable from at least the trust data, so that an authentication of the image data is enabled based on the encrypted image data. Additionally, the method 700 comprises providing 730 trusted image data comprising the encrypted image data.

The method 700 may comprise one or more optional steps corresponding to one or more aspects mentioned in connection with the concept or an embodiment described above.

Some embodiments relate to a method for an authentication of an image according to an embodiment. The method comprises receiving image data of an image to be authenticated, current trust data of the image to be authenticated and encrypted image data. The current trust data comprises a depth information of at least one pixel of the image to be authenticated or comprises data capable of being used to calculate a depth information of at least one pixel of the image to be authenticated or comprises characteristic data derived from at least a depth information of at least one pixel of the image to be authenticated or derived from data capable of being used to calculate a depth information of at least one pixel of the image to be authenticated. Further, the method comprises decrypting the encrypted image data to obtain image data of the image to be authenticated generated at the time it was taken, original trust data of the image to be authenticated generated at the time it was taken or characteristic data derived from the image data of the image to be authenticated generated at the time it was taken and original trust data of the image to be authenticated generated at the time it was taken. The original trust data comprises the depth information of at least one pixel of the image to be authenticated generated at the time it was taken or comprises data capable of being used to calculate a depth information of at least one pixel of the image to be authenticated generated at the time it was taken. Additionally, the method comprises comparing the image data of the image to be authenticated with the image data of the encrypted image, the current trust data with the original trust data or the characteristic data contained by the current trust data with the encrypted characteristic data, so that an alteration of the image data of the image to be authenticated is detectable.

The method may comprise one or more optional steps corresponding to one or more aspects mentioned in connection with the concept or an embodiment described above.

Embodiments may further provide a computer program having a program code for performing one of the above methods, when the computer program is executed on a computer or processor. A person of skill in the art would readily recognize that steps of various above-described methods may be performed by programmed computers. Herein, some embodiments are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. The embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant). Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

What is claimed is:

1. A camera for generating trusted image data, the camera comprising:
   an image data generator of the camera configured to generate image data of an image to be taken of a three-dimensional scene and trust data of the three-dimensional scene,
   wherein the trust data comprises a pixel depth value of at least one pixel of the image to be taken or comprises data used to calculate the pixel depth value of at least one pixel of the image to be taken;
   a processor of the camera configured to generate encrypted image data by encrypting within the camera at least the trust data or characteristic data derivable from at least the trust data; and
   an output unit of the camera configured to provide trusted image data comprising the encrypted image data;
   wherein the pixel depth value is a relative depth between different objects of the three-dimensional scene, or is an absolute depth between an object of the three-dimensional scene and the camera.

2. The camera according to claim 1, wherein the trust data comprises absolute pixel depth value of at least one pixel of the image to be taken or comprises data capable of being used to calculate absolute pixel depth information of at least one pixel of the image to be taken.

3. The camera according to claim 1, wherein the image data generator comprises a time-of-flight camera or a sensor system based on a structured light principle configured to generate two-dimensional image data of the image to be taken and trust data indicating individual pixel depth information for a plurality of pixels of the image to be taken.

4. The camera according to claim 1, wherein the image data generator comprises a stereoscopic camera configured to generate image data of a first image to be taken of a three-dimensional scene and image data of a second image to be taken of the three-dimensional scene, wherein the stereoscopic camera is configured to take the first image and the second image from different view angles, wherein at least a part of the image data of the second image represents data capable of being used to calculate a pixel depth value of at least one pixel of the image to be taken.

5. The camera according to claim 1, wherein the processor is configured to encrypt data by asymmetric encryption.

6. The camera according to claim 1, comprising a memory unit configured to store a private key of an encryption algorithm used by the processor for generating the encrypted image data, wherein the output unit is configured to provide a public key of the encryption algorithm.

7. The camera according to claim 1, wherein the processor is configured to generate characteristic data derivable from at least the trust data by calculating hash data based on at least the trust data.

8. The camera according to claim 1, further comprising a position determiner of the camera configured to determine a position of the camera and enable an addition of position data indicating the determined position to the trust data.

9. The camera according to claim 8, further comprising an internal clock configured to add time data to the trust data, wherein the time data indicates a time the position of the camera was determined by the position determiner, which differs from a time the image from the scene was taken.

10. The camera according to claim 1, further comprising an internal clock configured to add time data indicating a time, the image is taken, to the trust data.

11. The camera according to claim 10, further comprising a receiver configured to receive a clock synchronization signal from an external clock, wherein the internal clock is configured to be synchronized with the external clock based on the clock synchronization signal, wherein the internal clock is configured to provide or to add synchronization data, wherein the synchronization data indicates a time the internal clock was last synchronized.

12. The camera according to claim 1, further comprising an additional sensor comprising a compass or a three-dimensional angle sensor configured to determine orientation data to be added to the trust data.

13. The camera according to claim 1, wherein the output unit is configured to provide image data of a taken image of a three-dimensional scene or trust data of the three-dimensional scene.

14. A camera for generating trusted image data, the camera comprising:
- an image data generator of the camera configured to generate image data of an image to be taken from a scene;
- a position determiner of the camera configured to determine a position of the camera and configured to provide trust data comprising information on the determined position;
- a clock of the camera configured to add time data or position confidence data to the trust data, wherein the time data indicates a time the position of the camera was determined by the position determiner, which differs from a time the image from the scene was taken, or the position confidence data indicates a confidence level of the determined position based on the time data indicating a time the position of the camera was determined by the position determiner, which differs from a time the image from the scene was taken;
- a processor of the camera configured to generate encrypted image data by encrypting within the camera at least the trust data or characteristic data derivable from at least the trust data, so that an authentication of the image data is enabled based on the encrypted image data; and
- an output unit of the camera configured to provide trusted image data comprising the encrypted image data.

15. A camera for generating trusted image data, the camera comprising:
- an image data generator of the camera configured to generate image data of an image to be taken from a scene;
- a clock of the camera configured to provide trust data representing time data indicating a time, the image is taken;
- a receiver of the camera configured to receive a clock synchronization signal from an external clock, wherein the clock is configured to be synchronized with the external clock based on the clock synchronization signal, wherein the clock is configured to add synchronization data or time confidence data to the trust data, wherein the synchronization data indicates a time, the time of the clock was synchronized most recently, or the time confidence data indicates a confidence level of the time data based on the synchronization data indicating a time, the time of the clock was synchronized most recently; and
- a processor of the camera configured to generate encrypted image data by encrypting within the camera at least the trust data or characteristic data derivable from at least the trust data, so that an authentication of the image data is enabled based on the encrypted image data; and
- an output unit of the camera configured to provide trusted image data comprising the encrypted image data.

16. The camera according to claim 1, wherein an encrypted pixel depth value in the encrypted image data is configured to be utilized to authenticate an image data generated by the camera.

* * * * *